United States Patent [19]
Rey

[11] 3,871,873
[45] Mar. 18, 1975

[54] METHOD FOR PRODUCING NICKEL BY SEGREGATION OF ITS OXIDE ORES

[75] Inventor: Maurice Rey, Paris, France

[73] Assignees: "Le Nickel"; "Societe Miniere et Metallurgique de Penarroya", both of Paris Cedex, France

[22] Filed: Nov. 6, 1973

[21] Appl. No.: 413,265

[30] Foreign Application Priority Data
Nov. 6, 1972 France .............................. 72.39190

[52] U.S. Cl. ................................................ 75/82
[51] Int. Cl. ........................................... C22b 23/02
[58] Field of Search ............................ 75/82; 48/85

[56] References Cited
UNITED STATES PATENTS
2,130,163  9/1938  Tiddy et al. ............................. 45/85
3,761,245  9/1973  Bingham ................................. 75/82

Primary Examiner—L. Dewayne Rutledge
Assistant Examiner—M. J. Andrews
Attorney, Agent, or Firm—Fleit & Jacobson

[57] ABSTRACT

A method for producing nickel by segregation of nickel oxide ores in which the segregation is carried out under non-fluid bed conditions and in a furnace which is internally heated by means of a combustible gas rich in carbon monoxide and substantially free from hydrogen and steam.

11 Claims, 1 Drawing Figure

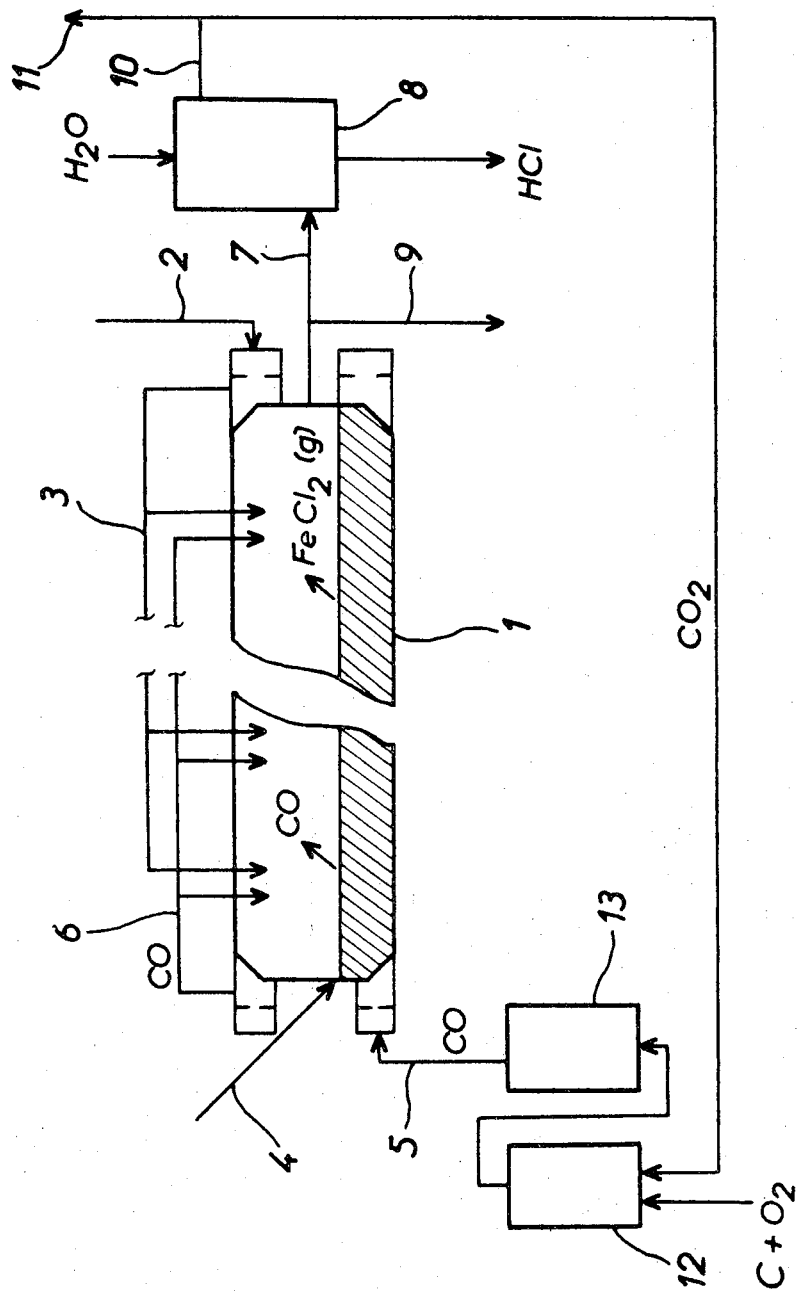

METHOD FOR PRODUCING NICKEL BY SEGREGATION OF ITS OXIDE ORES

It is well-known that metals can be produced from their ores by the so-called "segregation method" which consists in reacting the ore at a high temperature with a mixture of carbon and a chloridizing agent. The metal volatilizes in the form of its chloride and is collected in the metallic state on the carbon particles wherefrom it is easily separated by flotation or by magnetic separation, which produces a concentrate very rich in metal. When the operating conditions are satisfactory, the method allows to reach a yield of 90% with respect to the metal.

In the particular case of the production of nickel, the segregation reaction must be carried out at a temperature near 1,000°C, and the chloridizing agent is preferably an alkaline-earth metal chloride. This chloridizing agent can also be gaseous hydrogen chloride, as described in the French patent N° 2,063,366.

Since the nickel chloride which is formed during the segregation reaction is easily hydrolysed, the operating conditions must be carefully chosen and closely controlled, in order to avoid any contact between the products which are treated and gases containing steam.

In another connection, it is necessary to provide the reactive mixture with some amount of heat in order to bring the reagents to the suitable temperature. Due to the endothermic character of these reactions, heat is also needed for maintaining the products at the same temperature during the 30 to 60 minutes during which the reactions proceed. Unfortunately, it is impossible to heat externally the segregation furnace, since the refractory linings of the furnace present a low thermal conductivity and, on the other hand, since no metal can resist, at the operating temperature, to the corrosion which results from the fact that chlorides are used.

In order to solve the problem of the heating of the furnace, the French patent N° 71-07.101 suggests to carry out the segregation in a fluid bed, by combustion in the mass, whereby this combustion provides in the same time for the movement of the bed by the produced fumes, and for the thermal supply which is necessary to compensate for the external losses and for the absorption of heat due to the segregation reactions.

The object of the present invention is to provide for means for carrying out the segregation of nickel ores on an industrial scale without the need of using a fluid bed.

According to the invention, this aim is reached by a direct heating which is carried out within the segregation furnace by the combustion of a gas rich in carbon monoxide and substantially free from hydrogen and steam.

Preferably, said gas rich in carbon monoxide is a mixture of carbon monoxide and nitrogen and it contains at least 75% of carbon monoxide. This gas must be substantially free from hydrogen and steam in order to avoid the disturbance of the segregation operations by a partial decomposition of nickel chloride.

Such a combustible gas can be prepared in a special gas generator supplied with coke, oxygen and a gaseous mixture of carbon dioxide and nitrogen. This mixture issues preferably from the segregation furnace itself, since the fumes contained in this furnace contain 40 to 60% of carbon dioxide after the gaseous hydrogen chloride has been eliminated by scrubbing the fumes.

The combustion of the combustible gas rich in carbon monoxide is, according to the invention, carried out by means of air or, preferably by means of air enriched in oxygen. The use of pure oxygen cannot be contemplated since it would lead to an excessive combustion temperature and it would be difficult to avoid a local sintering or smelting of the ore. For the same reason, the total amount of oxygen in the enriched air is preferably not higher than 50 vol-%.

According to the invention, the enriched air which is used is introduced into the segregation furnace in an amount near the theoretical amount which is necessary for producing fumes free from carbon monoxide and oxygen. A simple calculation will allow those skilled in the art to determine the necessary flow-rate of enriched air, as a function of the composition and of the flow-rate of the combustible gas which is used. Of course, the volume of the gases released by the segregation reactions must be taken into account. In fact, these gases contain generally 10 to 30 vol-% of carbon monoxide and 10 to 20 vol-% of ferrous chloride and the combustion of these gases lead to a supplementary consumption of oxygen. It is also possible to analyse continuously the fumes of the furnace by well-known modern methods.

The method according to the invention can be carried out in any type of non-fluid bed furnace. It is yet particularly advantageous to use therefor a rotary kiln since this type of furnace provides for an efficient mixing of the reagents with the ore. Furthermore, such a furnace is very convenient for being heated internally by combustion, since its rotation allows the transmission of heat to the batch, its surface being constantly renewed.

Such a rotary furnace is advantageously of the type described in the French patent N° 2,066,854.

Another advantage of the use of a rotary furnace lies in the fact that the ore is contacted with the gases only by its surface, so that the interstitial atmosphere in the mass of the ore is as preserved as possible.

In order to provide with a regular heating of the products, the combustible gas and the enriched air are preferably introduced at various places along the furnace. Well-know devices are used therefor. They generally comprise several burners arranged at various places on the furnace and fed by pipes leading to fixed heads at the ends of the furnace. These burners are preferably constructed in order to provide for a progressive mixture of the combustible and the combustive gases, thus avoiding the formation of a too hot flames which could smelt or sinter partially the ore. In fact, it is advisable to obtain flames which are rather soft and voluminous and which consequently facilitate the transmission of heat to the ore and to the walls of the furnace without over-heating.

In an embodiment of the present invention, the ore is preheated before its introduction into the furnace and the reagents are also preheated as much as possible, in order to reduce to a minimum the addition of heat by the combustion of combustible gas. The preheating of the ore can be carried out in a fluid bed, in order to reduce to a minimum the amount of residual water it contains, this amount being preferably near 0.25 wt-% with respect to the weight of the ore. This amount of residual water is, in fact, sufficient for the decomposition of calcium chloride into lime and gaseous hydrogen chloride, the latter being the product which chlorinates the ore.

In the usual case when carbon and calcium chloride are used, the carbon can be added to the ore before its preheating at a temperature of 900° to 1,000°C, and the calcium chloride is introduced into the furnace, either at 700 °C, in the solid state and admixed with ore dust, or at 600°, in the molten state and admixed with sodium chloride, this mixture forming an eutectic at about 500°C when equimolecular conditions are used. The molten mixture is then sprayed into the furnace.

The method according to the invention presents the advantage that it avoids the introduction into the furnace of steam which is detrimental to the safe running of the operations. Furthermore, the volume of the produced combustion fumes is reduced to a minimum, and these fumes can be used, if they are scrubbed, for the production of fresh amounts of combustible gas, as mentioned hereinbefore.

The method according to the invention is preferably carried out on a continuous manner, the furnace being slightly inclined as well-known in the art.

The appended drawing shows very schematically an advantageous embodiment of the present invention.

As will be seen on this drawing, a rotary kiln 1 is supplied with enriched air at 2 which is then distributed along the furnace by inlet holes 3. The ore and its additives (carbon and $CaCl_2$) are introduced at 4 into the furnace and the combustible gas is admitted by ports 5 and 6, which are spaced from one another along the furnace.

At the outlet of the furnace, the gases 7 are lead to a scrubber 8 where they are freed from the hydrochloric gas they contain, the segregated ore being extracted at 9. The gases 10 issuing from the scrubber 8 are substantially a mixture of nitrogen and carbon dioxide. They are partly expelled by a stack 11 and partly lead to a gas generator 12 supplied with coke and oxygen. The gases issuing from the gasogene 12 are cooled and dryed at 13 and introduced into the segregation furnace at 5.

The following example presents no limitative character and is merely destinated to illustrate how the method according to the invention can be carried out.

EXAMPLE.

A finely comminuted nickel ore containing 1.70 wt-% of nickel and 10 wt-% of iron (garnierite) is admixed with 2 wt-% carbon and preheated in a fluid bed at a temperature near 900°C. This mixture is introduced into the inlet of a rotary kiln, which is also supplied with an amount of calcium chloride which weights 6% of the weight of the ore when the latter is heated at 600°C and admixed with 10% of ore dust.

These products stay in the furnace during about 45 minutes, at a temperature which increases progressively from 900°C to 1.050°C.

On the other hand, the furnace is fed with gasogene gas containing 87% CO and 13% nitrogen, and with a mixture of air and oxygen which contains on the whole 33 vol-% of oxygen.

The consumption of gas, calculated at normal conditions, is 36 m³ per metric ton of raw ore. The volume of the fumes issuing from the furnace is 90 m³ per metric ton of ore, which corresponds to about 4 times the volume of the gases produced by the reactions.

In fact, the chemical reactions produce 23 m³ of gas per metric ton of raw ore, and the composition of this gas, in vol-%, is the following one:

| | |
|---|---|
| CO | 18,0% |
| $CO_2$ | 49,0% |
| HCl | 13,0% |
| $FeCl_2$(g) | 13,0% |
| $H_2O$ | 7,0% |
| | 100,0% |

These chemical reactions consume 36 therms per ton of ore.

On the other hand, the heating of the products and the external losses of heat absorbate about 47 therms. The total consumption of heat is consequently 83 therms.

This amount of heat issues, on the one hand, from the combustion of the CO and the gaseous $FeCl_2$ present in the segregation gases, this combustion producing 17 therms, and, on the other hand, from the combustion of the combustible gas which produces 1.85 therms per m³.

The preceding results make it possible to reckon the comsumption of each of the reagents which are necessary for heating the furnace. These consumptions are the following ones:

| at the gasogene | |
|---|---|
| Carbon | 14 kg |
| Oxygen | 11 m³ |
| in the furnace | |
| Oxygen I | 2,75m³ |
| Oxygen II | 7,50m³ |
| | 10,25m³ |

The amount of oxygen I is used to burn the reaction gases and the amount of oxygen II is used to burn the injected combustible gas.

An economic estimation shows that these consumptions are low when compared with the total costs involved when the segregation method is carried out.

What we claim is:

1. A method for producing nickel by segregation of nickel oxide ore comprising mixing said ore with a carbonaceous material and a chloridizing material, introducing said mixture into a non-fluidized bed furnace, and internally heating said furnace to a temperature of about 800° to 1050° C by burning a combustible gas in said furnace containing at least 75 volume percent carbon monoxide, said combustible gas being substantially free from hydrogen and steam.

2. The method of claim 1 wherein substantially the remainder of said combustible gas is nitrogen.

3. The method of claim 1 wherein said combustible gas is burned with air.

4. The method of claim 1 wherein said combustible gas is burned with a mixture of air and oxygen containing less than 50 volume percent oxygen.

5. The method of claim 1 wherein said furnace is a rotary kiln.

6. The method of claim 1 wherein said temperature is about 900° to 1050° C.

7. A method for producing nickel by segregation of nickel oxide ore comprising mixing said ore with a carbonaceous material and a chloridizing material, introducing said mixture into a non-fluidized bed furnace, and internally heating said furnace to a temperature of about 800° to 1050° C by burning a combustible gas in said furnace containing at least 75 volume percent carbon monoxide, said combustible gas being substantially free from hydrogen and steam, washing the fumes from said furnace with water in a scrubber, introducing said fumes after said washing into a gasogene, introducing coke and oxygen into said gasogene, and recycling the gases from said gasogene into said furnace as said combustible gas.

8. The method of claim 7 wherein said combustible gas is burned with air.

9. The method of claim 7 wherein said combustible gas is burned with a mixture of air and oxygen containing less than 50 volume percent oxygen.

10. The method of claim 7 wherein said furnace is a rotary kiln.

11. The method of claim 7 wherein said temperature is about 900° to 1050° C.

* * * * *